United States Patent [19]

Rausch

[11] Patent Number: 4,820,563
[45] Date of Patent: Apr. 11, 1989

[54] TIRE BEAD ASSEMBLY

[75] Inventor: Doyle W. Rausch, Niles, Mich.

[73] Assignee: National-Standard Company, Niles, Mich.

[21] Appl. No.: 85,642

[22] Filed: Aug. 13, 1987

[51] Int. Cl.⁴ .............................................. D02G 3/00
[52] U.S. Cl. .................................. 428/35.8; 428/192;
428/222; 428/224; 428/294; 428/295; 428/371;
428/399; 428/457; 428/35.9; 428/36.1;
428/36.8
[58] Field of Search .............. 428/326, 192, 222, 294,
428/295, 371, 457, 399, 224

[56] References Cited

U.S. PATENT DOCUMENTS

| | | | |
|---|---|---|---|
| 2,365,396 | 12/1944 | Cunningham | 428/399 |
| 3,273,978 | 9/1966 | Paul | 428/295 |
| 3,592,727 | 7/1971 | Weaver et al. | 428/399 |
| 3,700,012 | 10/1972 | Alderfer | 428/295 |
| 3,933,345 | 1/1976 | Fide et al. | 428/371 |
| 4,532,163 | 7/1985 | Hoppie | 428/192 |
| 4,559,249 | 12/1985 | Aregaya | 428/36 |
| 4,594,275 | 6/1986 | Stolz | 428/36 |

*Primary Examiner*—James J. Bell
*Attorney, Agent, or Firm*—Emrich & Dithmar

[57] ABSTRACT

Weftless and single wire tire bead assemblies are disclosed where at least one of the termination ends of the weftless layer or of the single wire bead are mechanically deformed or heat treated. Tire bead assemblies are disclosed where a cushion or wedge means is positioned either between the termination end and the body of the bead assemblies are positioned adjacent the termination ends and the body of the bead assembly.

106 Claims, 6 Drawing Sheets

TIRE BEAD ASSEMBLY

BACKGROUND OF THE INVENTION

The present invention relates to novel means for the treatment of the wire termination ends in the inner row of wires of a tire bead ring construction which substantially dissipates and eliminates the stress concentration in the wire endings area of the tire bead thereby producing a substantially higher strength efficient tire bead construction.

It has been observed that when a tire bead comprised of a ribbon or tape-type weftless bead is manufactured and placed on an expandable mandrel to measure the breaking load and tensile strength of the finished tire bead structure, the tire bead ring breaks at or closely adjacent to the point where the tire bead ends are in contact with the inside surface of the tire bead ring or body. While it is known that the approximate breaking strength level of a bead tested in the above manner is directly proportional to the number of wire wraps in the bead and the nominal strength of said wire, i.e., the higher the desired bead strength the greater the number and/or strength of wires utilized, it is desirable to obtain maximum bead strength from the wires comprising said bead.

SUMMARY OF THE INVENTION

It is one object of the present invention to provide a novel and unique tire bead ring assembly having substantially improved breaking load and tensile strength efficiency over prior art tire bead ring assemblies.

It is a further object of the present invention to provide novel means and apparatus for the treatment of and the positioning of the bead ends against the inner surface of the tire bead ring or body to provide an improved relative breaking load and tensile strength of the tire bead ring assembly.

In accordance with the present invention, a conventional prior art 15 inch diameter weftless, ribbon or tape-type tire bead ring assembly having a 5 ×5 tire bead construction, composed of five 0.037 inch diameter wires having an average breaking strength of 315.2 pounds each and enveloped side-by-side in a rubber ribbon wrapped upon itself five times circumferentially, and has a calculated breaking strength of 7,880 pounds. When the 15 inch ribbon beads were positioned on an expandable mandrel and a breaking load exerted thereon, the 5×5 construction was observed to result in an average breaking load of about 5,200 lbs. or approximately 65% of the regular tensile wire measured strength of the individual strands in the wire. Thus, the tensile strength measurements of individual bead wires indicate that the total strength of the assembled bead is lower, on the order of about 30–35% of the sum of the strength of the individual bead wires.

Accordingly, it is still another object of the present invention to provide a weftless or ribbon construction, as well as a single wire tire bead construction, having a reduced high stress concentration in tire bead body or adjacent to the wire ends by physically treating the wire ends by flattening, tapering, pointing, softening or otherwise preventing and eliminating the point contact between the wire ends of the individual wires and, preferably, the inner surface of body of the tire bead ring. The means of treating the wire ends may include grinding, swagging, machining, and heat treating, such as wire surface welding, braising, soldering. The means for treating the termination wire ends includes wrapping the wire ends to eliminate the point contact or stress concentration between the wire ends and the body of the bead ring which treatment or processing is effective, it is believed, to eliminate the point contact between the ends of the bead wires on the inside diameter of the tire bead ring from making contact with the body of the tire bead.

It is believed also that it is important that during the treatment of the wire ends in accordance with the present invention, such as by flattening, tapering, pointing, welding, braising, soldering, or otherwise heat treating the wire ends, to substantially minimize or reduce the point contact with the remaining bead wires in the body of the bead ring (or conversely increase area of contact), which point contact, or stress concentration, results in substantial reduction of strength efficiency of the bead ring body and thereby defeats the unique and novel end unexpected results of the present invention.

The invention consists of certain novel features and structural details hereinafter fully described, illustrated in the accompanying drawings, and particularly pointed out in the appended claims, it being understood that various changes in the details may be made without departing from the spirit and scope thereof, or sacrificing any of the advantages of the present invention.

DESCRIPTION OF PREFERRED EMBODIMENTS

Figure 1:
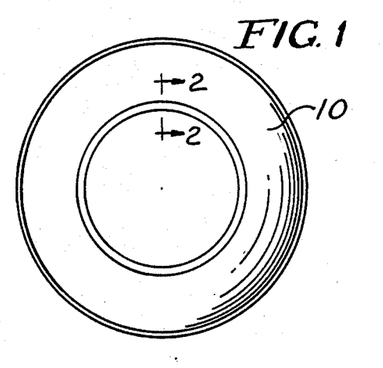
FIG. 1 is a side elevational view of a finished tire containing a tire bead construction in accordance with the present invention.
Figure 2:
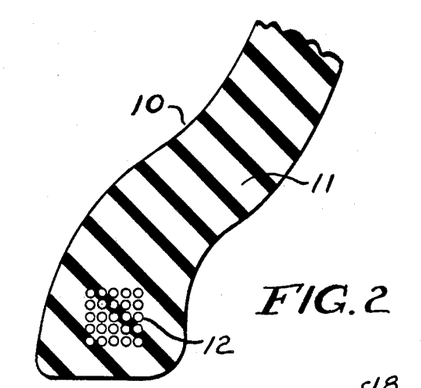
FIG. 2 is a fragmentary sectional view taken along lines 2—2 of FIG. 1 showing the bead portion of the finished tire.

For the purpose of facilitating and understanding the present invention illustrated in the drawings of several embodiments, like numerals have been used throughout the several views to designate the same or similar parts. In FIG. 1, a pneumatic tire 10 is shown which incorporates the novel and unique tire bead ring assembly 12 constructed in accordance with the teachings of the present invention. FIG. 2 is an enlarged section of the tire bead portion 11 of the pneumatic tire 10 of FIG. 1, which shows a tire bead ring assembly 12 embedded within the tire bead rubber portion 11 of the pneumatic tire 10, as is known in the art.

Figure 3:
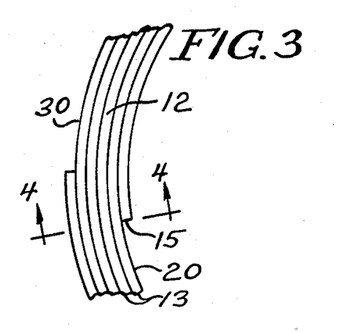
FIG. 3 is a fragmentary axial plan view of a conventional 5×5 weftless or ribbon tire bead construction.
Figure 4:
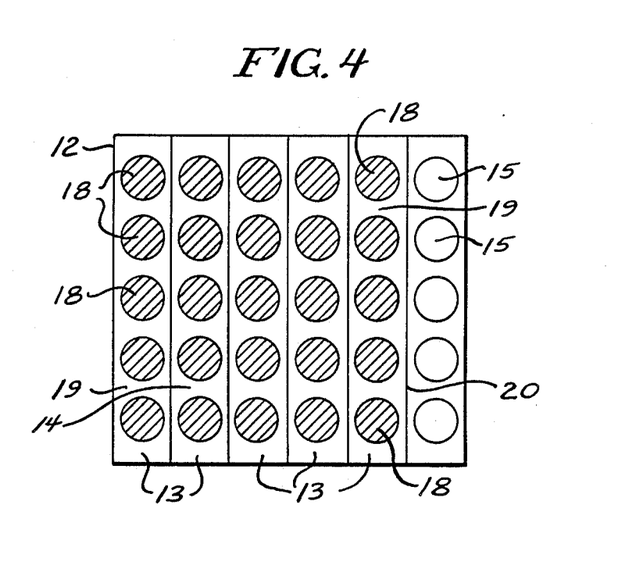
FIG. 4 is a cross-sectional view of the 5×5 weftless tire bead construction taken along lines 4—4 of FIG. 3.

The present invention is directed to the novel positioning and the novel mechanical or physical treatment of the wire or termination ends of the inner row or rows of wires of a tire bead ring assembly 12, several embodiments of the present invention are shown, in FIGS. 3–4, 7–8, 12, 15–18, 21–22, and 25–27, which illustrate a 5×5 weftless or ribbon tire bead construction, as is well known and commonly used in the manufacturing of pneumatic tires. Specifically, FIGS. 3 and 4 illustrate a conventional 5×5 weftless or ribbon tire bead ring assembly 12 which is comprised of a tape-type ribbon layered member 13 having five wires 18 in each layer of the tape, with each of the wires 18 being embedded within a rubber coating 19 and bound within the tape member and then wound upon itself to provide a 5×5 tire bead assembly. In such a conventional assembly, the inner tire bead wire ends 15 are square cut thereacross on the inner peripheral surface 20 of the tire bead body 14. Although FIGS. 3–4, 7–8, 12, 15–18, 21–22 and 25–27 illustrate 5 ×5 weftless tire wire bead assemblies, it is understood that the scope of the present invention includes a tire bead assembly having a 4×4, 3×4, or any other layered configuration or construction, as may be desired.

Figure 5:
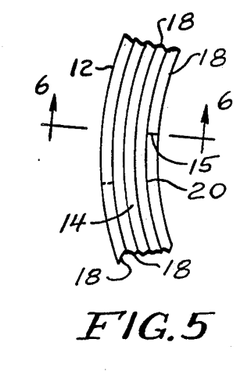
FIG. 5 is a fragmentary axial plan view of a conventional 5×5 single wire tire bead construction.
Figure 20:
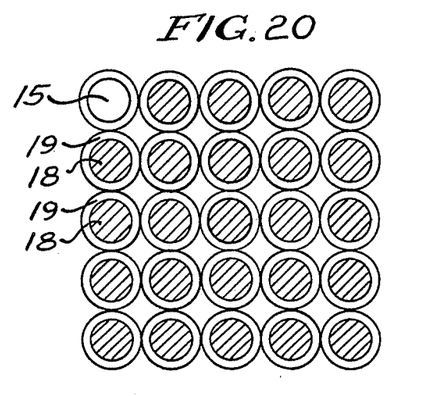
FIG. 20 is a cross-sectional view of the 5×5 single wire tire bead assembly taken along line 20—20 of FIG. 19.
Figure 20A:
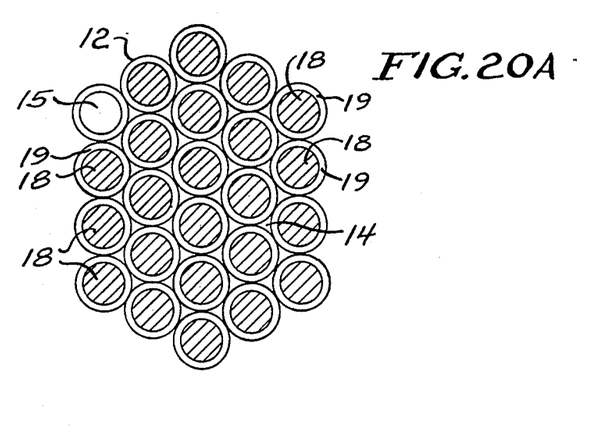
FIG. 20A is a cross-sectional view of a 4-5-6-5-4 single wire tire bead construction in accordance with the present invention.

FIGS. 5–6, 19–20 and 23–24 illustrate a conventional 5×5 single wire tire bead assembly 12 which is wrapped upon itself 25 times to provide the single wire tire bead assembly and FIGS. 5A and 20A illustrate a 4-5-6-5-4 single wire tire bead assembly which is wrapped upon itself 24 times to provide the single wire tire bead assembly. As shown in the 5×5 construction of FIG. 5, the inner tire bead wire 18, having an end 15, is cut and is positioned against the inner peripheral surface 20 of the remaining wires 18 of the tire bead ring body 14. As shown in 4-5-6-5-4 construction of FIG. 5A, the inner tire bead wire 18, having an end 15, is cut and is positioned against the inner peripheral surface 20 of the remaining wires 18 of the tire bead ring body 14. Although FIGS. 5A and 20 illustrate 4-5-6-5-4 single wire tire bead assemblies, it is understood that the scope of the present invention includes a single wire tire bead assembly having 3-4-5-4-3, 3-4-3, 2-3-2 or any single wire construction, as may be desired. In such single wire tire bead assemblies, the wires are encapsulated or contained within a rubber film, coating or sheath material 19 to facilitate handling and manufacturing of the single wire bead ring assembly 12.

The conventional tape or ribbon-type weftless tire bead assembly, as shown in FIGS. 3-4 and 17-18, as well as single wire tire bead assemblies, as shown in FIGS. 5-6 and 19-20A, are known in the art and the present invention is particularly directed to the mechanical and/or physical treatment of and the handling or positioning of the termination ends 15 of the weftless tape 13 or single wire 18 and the positioning of the ends 15 of wires of the tire bead ring assemblies 12 with respect to the inner peripheral surface 20 of the tire bead ring or body 14. The treatment and handling of the termination ends 15 in accordance with the several embodiments of the present invention substantially dissipates and eliminates the stress concentration resulting from the wire endings contacting of the tire bead ring body 14, thereby providing a substantially higher strength efficient tire bead ring assembly 12, than conventional tire bead assemblies.

Table 1 summarizes test data for various modifications or treatments of the termination ends of experimental bead ring assemblies. The assemblies consisted of circular bead hoops formed on a commercial bead making machines, as is known in the art. After removal from the bead making machine and modification of the termination ends, two layers of covering were applied to completely envelope the cross-section of the bead hoop so as to simulate the bead area of a tire. The first layer was made of 1/16th inch thick gum rubber, the second layer of 1/32nd inch thick square woven nylon reinforced rubber. A reference standard, identified as Sample A, is a 15 inch weftless or ribbon-type bead assembly comprised of a 5×5 construction containing 0.037 inch regular tensile wire. Sample A had a calculated strength of 7,880 pounds based upon linear tensile break-load measurements of individual wires. For the reference standard 5×5 ribbon bead assembly, as represented by sample A, the tire bead ends 15 were cut perpendicularly to the wire axis to permit to terminate against the inner peripheral surface 20 of the tire bead ring body assembly, AS SHOWN IN FIGS. 3 and 4. For Sample A, the measured elongation at the breaking point was 0.988 inch which represented approximately a 2.0% increase in circumference at the breaking point. The measured direct breaking load was 5,225 pounds, which represents a tensile strength of approximately 66% of the calculated strength of the 25 wires pf 7880 pounds.

Figure 7A:
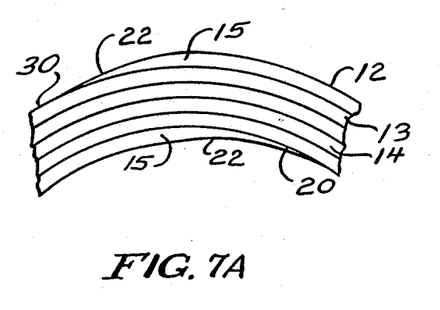
FIG. 7A is a axial plan view of a 5×5 weftless tire bead having tapered tire bead ends on the inner and outer termination ends in accordance with the present invention.
Figure 7B:
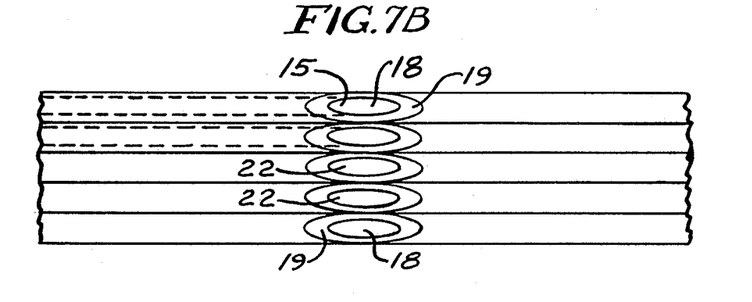
FIG. 7B is a fragmentary view looking radially outwardly through the weftless tire bead of FIG. 7A in accordance with the present invention.
Figure 8A:
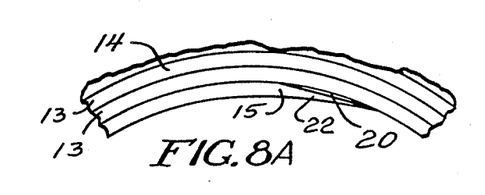
FIG. 8A is a fragmentary axial plan view of a 5 ×5 weftless tire bead having tapered tire bead ends in accordance with the present invention.
Figure 8B:
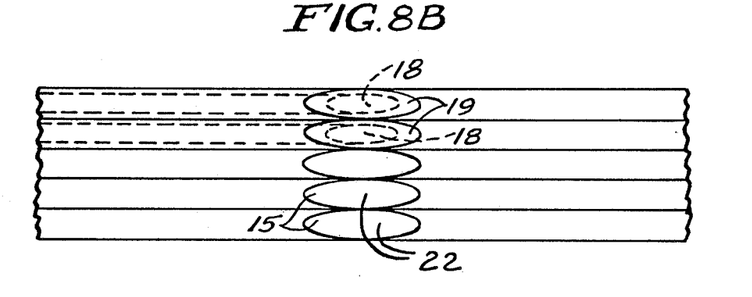
FIG. 8B is a fragmentary view looking radially outwardly through the weftless tire bead of FIG. 7A in accordance with the present invention.

FIG. 7A-8A illustrate a weftless tire bead assembly 12 made in accordance with the teachings of the present invention. In FIGS. 7A-7B, the inner tire bead wire ends 15 include a tapered portion 22 which engages the inner peripheral surface 20 of the tire bead ring body 14. The tapered portion 22 may be produced by angle cutting the tire bead wire ends 15 or by swagging or stamping the termination ends 15 to taper the ends thereof. Sample B of Table I represents a tapered end having approximately a 30 degree shaped tapered end which has been obtained by stamping, swagging or cutting the wire end 15. The resultant tire bead assembly, as represented by Sample B, resulted in a measured direct breaking load of approximately 5,850 pounds. Such a tire bead assembly 12 possesses about a 12% increase in breaking strength over sample A, the standard prior art 5×5 weftless tire bead assembly. Sample C of Table I represents a tire construction wherein the tapered portion 22 of the wire ends 15 are approximately 1.5 inches long. The resultant tire bead assembly possessed a measured elongation of break of about a 10% increase and a measured direct breaking load of 6,225 pounds, or approximately an 19% increase over the square cut bead of sample A, the conventional prior art 5×5 weftless tire bead assembly.

Figure 9:
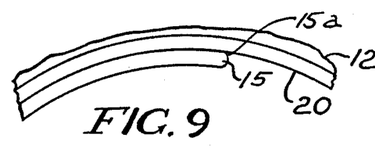
FIG. 9 is a fragmentary axial plan view of a 5×5 weftless tire bead showing rounded bead ends in accordance with the teachings of the present invention.

FIG. 9 illustrates a 5×5 weftless tire bead assembly 12 in accordance with the teachings of the present invention wherein the bead wire ends 15 are mechanically rounded 15a at the point where the inner bead ends engage the inner peripheral surface 20 of the tire bead ring body 14. Sample D of Table I summarizes data that such a tire bead assembly having rounded bead ends 15 which results is a direct breakage of 5925 pounds, or about a 13% increase over the conventional prior art square cut 5×5 tire bead assembly, of Sample A.

Figure 11:
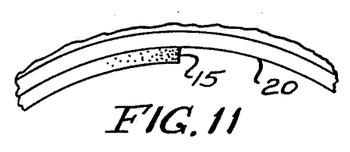
FIG. 11 is a fragmentary axial plan view of a 5×5 weftless tire bead showing a cushioned position between the tire bead ends and the radial body of the tire bead in accordance with the present invention.

FIG. 11 illustrates a 5×5 weftless tire bead assembly 12 wherein the tire bead wire ends 15 are mechanically softened by heat or flame treatment to soften the wire ends 15 at the point where the ends engage the inner peripheral surface 20 of the tire bead ring body 14. Sample E of Table I presents data for such a 5×5 tire bead assembly wherein the direct breaking load measures 5800 pounds, an increase about 11% over the conventional prior art 5×5 weftless bead assemblies, as represented by Sample A.

Figure 10:
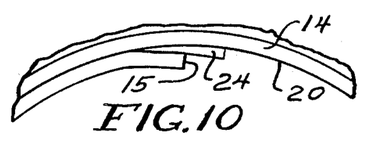
FIG. 10 is a fragmentary axial plan view of a 5×5 weftless tire bead showing softened or flame applied tire bead ends in accordance with the present invention.
Figure 12:
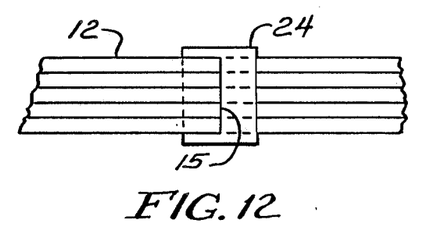
FIG. 12 is a fragmentary view looking radially outwardly through the weftless tire bead assembly of FIG. 10 showing the cushioning means placed between the tire bead ends and the radial body of the tire bead shown in FIG. 10 in accordance with the present invention.

FIGS. 10 and 12 illustrate a 5×5 weftless tire bead assembly having a cushioning material or means 24 positioned between the tire bead ends 15 and the inner peripheral surface 20 of the tire bead ring body 14. The cushioning material may be rubber, a reinforced fabric material, or even a metal such as aluminum strip. Sample F of Table I is a 5×5 tire bead assembly having a 0.062 inch thick rubber cushion material 24 inserted between the tire bead ends 15 and the tire bead ring body 14. Such a tire bead assembly 12 possessed approximately a 2.7% elongation at the breaking point and resulted in a structure which possessed a direct breaking load of 6465 pounds or approximately a 24% increase in the direct breaking load required to break the tire bead assembly. Sample G is the same type of 5×5 weftless tire bead assembly having a 0.033 inch thick fabric positioned between the tire bead ends 15 and the inner surface 20 of the tie bead ring body 14 and indicates about a 27% increase in elongation at the breaking point and that the direct breaking point was 6750 pounds, an increase of approximately 29% over a conventional prior art 5×5 tire bead structure of sample A. Finally, Sample H of Table I is a 5×5 tire bead assembly 12 in accordance with the present invention wherein the cushioning material 24 is 0.016 inch thick aluminum strip. The resultant tire bead assembly 12 possessed a measured direct breaking load of 5900 pounds, an approximately 13% increase in the direct breaking load over over conventional prior art 5×5 tire bead assemblies, as represented by sample A.

Figure 13:
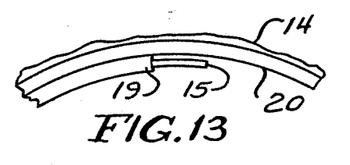
FIG. 13 is a fragmentary axial plan view of a 5×5 weftless tire bead assembly showing the tire bead ends as mobile with the extruded rubber or protective coating removed therefrom to prevent point contact of the tire bead end with the body of the tire bead and provide consolidation of the wire end region in accordance with the present invention.

FIG. 13 illustrates a further embodiment of the present invention wherein the tire bead wire ends 15 which have the protective rubber coating 19 stripped therefrom adjacent to the end to permit the wire ends 15 to be either mobile and out of direct contact with respect to the inner peripheral surface 20 of the bead ring body 14, or which facilitates movement of the wire ends into grooves between adjacent wires of the bead ring body, thus consolidating the wire termination area. Sample I of Table I indicates that the direct breaking load was 6165 pounds, an approximately 18% increase in strength in the direct breaking load of such a tire bead assembly over Sample A.

Figure 14:
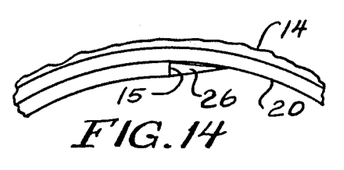
FIG. 14 is a fragmentary axial plan view of a tire bead assembly showing a wedge means positioned at the termination of the tire bead ends and against the body of the tire bead assembly in accordance with the present invention.
Figures 21, 22, 23, 24, 25, 26, 27:
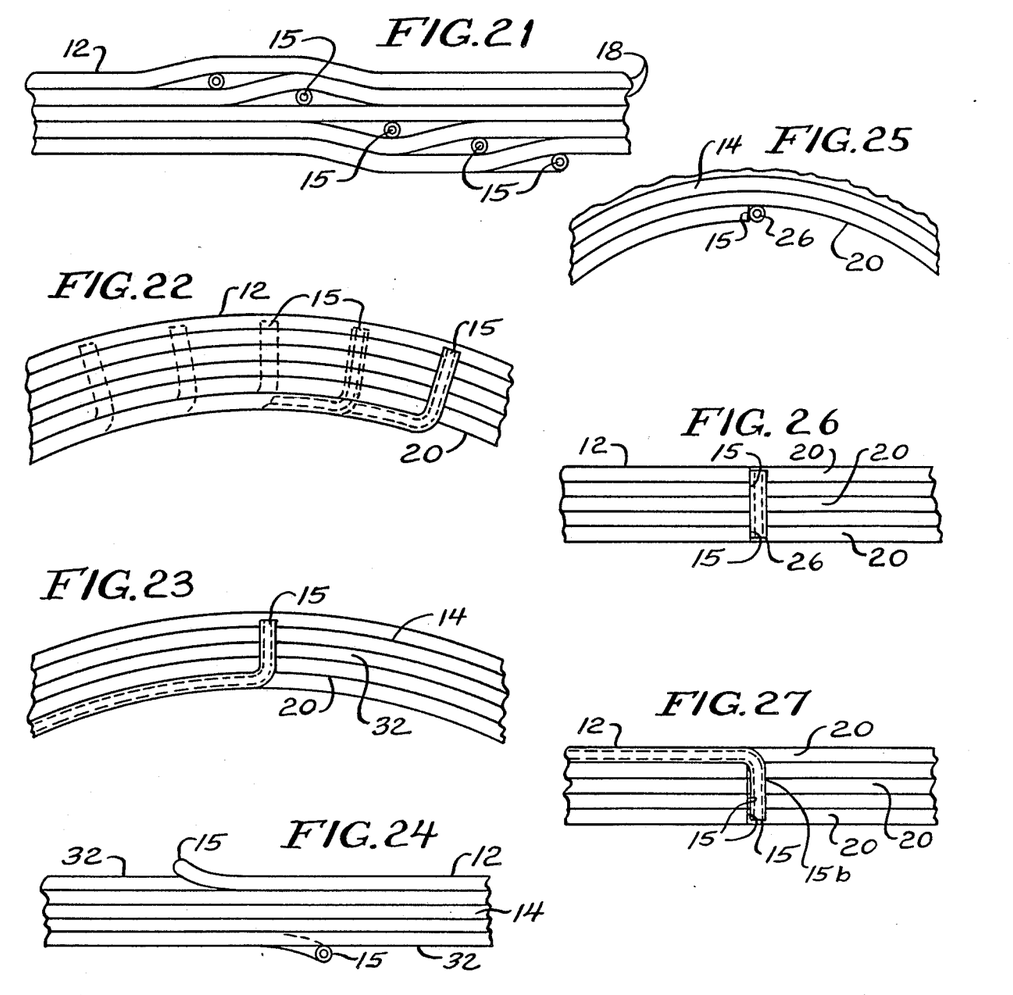
FIG. 21 is a fragmentary view looking radially inwardly through a 5×5 weftless tire bead assembly showing the staggered tire bead end extending upwardly through the tire bead assembly in accordance with the present invention.
FIG. 22 is a fragmentary axial plan view of the 5 ×5 weftless tire bead assembly of FIG. 21 showing the staggered tire bead ends turned upwardly through the body tire bead assembly in accordance with the present invention.
FIG. 23 is a fragmentary axial plan view of a 5 ×5 single wire tire bead assembly showing the tire bead ends turned upwardly along the side of the body of tire bead assembly in accordance with the present invention.
FIG. 24 is a fragmentary view looking radially inwardly through the tire bead assembly of FIG. 23, showing the inner and outer tire bead wire ends terminating along the side of the tire bead assembly in accordance with the present invention.
FIG. 25 is a fragmentary axial plan view of a 5×5 weftless tire bead assembly showing a round wedge means positioned at the termination of the tire bead ends and against the body of the tire bead assembly in accordance with the present invention.
FIG. 26 is a fragmentary view looking radially outwardly through the weftless tire bead assembly of FIG. 25.
FIG. 27 is a fragmentary view looking radially outwardly through a weftless tire bead assembly wherein one of the termination ends of the tire bead ends is angled to rest adjacent the remaining tire bead ends in accordance with the present invention.

FIG. 14 illustrates still another modification and embodiment of the present invention wherein a wedge means 26 is positioned against or adjacent to the square cut bead ends 15 to reduce the stress concentration between the bead ends 15 and the inner peripheral surface 20 of the tire bead ring body 14. The tapered wedge may be composed of rubber or may be of a metal material. Sample J of Table I represents a tapered rubber wedge of about 1.25 inches in length positioned on the bead ends 15 which resulted in a measured load of 5725 pounds, an increase in the breaking load of about 10% over the conventional prior art 5×5 wire bead assembly of Sample A. When a tapered metal wedge 26 of approximately 1 inch in length is positioned adjacent the bead ends 15, the resultant direct breaking load was measured at 5995 pounds for a 5×5 tire bead assembly 12, as shown in sample K, which results in an increase in breaking strength of approximately 15% over the standard, Sample A. FIG. 24, illustrative of a modification providing for the bending of wire ends 15 to the sidewalls 32 of the tire bead assembly 12, is represented in Table I by sample L which produced an increase in strength of about 10% over sample A. FIGS. 25 and 26 are illustrative of the placement of a wire insert or wedge means 26, perpendicular to the tire bead ends 15, a further embodiment of the present invention. The added wedge means may be a round or flattened wire, wedge shaped (as shown in FIG. 14) or of a different material than the bead wire material. Sample M in Table I is a tire bead having wire end terminations occurring at staggered positions relative to one another around the bead internal circumference. The resulting increase in strength was about 20% over Sample A. FIG. 27 illustrates an embodiment of the present invention where one of the termination ends 15b is longer than the other wire termination ends 15 and is bent perpendicular the remaining wire termination ends 15.

TABLE 1

15 INCH WEFTLESS BEADS, 5 × 5 CONSTRUCTION 0.037 INCH REGULAR TENSILE WIRE - CALCULATED STRENGTH 7880 POUNDS

| BEAD SAMPLE | BREAK ELONGATION Inches | BREAK ELONGATION Percent | DIRECT BREAK LOAD, POUNDS | MODIFICATIONS |
|---|---|---|---|---|
| A | 0.988 | 2.09 | 5225 | None |
| B | 1.029 | 2.18 | 5850 | Tapered 30° wire |
| C | 1.116 | 2.37 | 6225 | Tapered (1.5 inch) wire ends |
| D | 1.062 | 2.25 | 5925 | Rounded wire ends |
| E | 1.103 | 2.34 | 5800 | Softened wire ends |
| F | 1.278 | 2.71 | 6465 | Cushioned (0.062 inch thick rubber) at wire ends |
| G | 1.264 | 2.68 | 6750 | Cushioned (0.033 inch thick fabric) at wire ends |
| H | 1.036 | 2.20 | 5900 | Cushioned (0.016 inch thick Al strip) at wire ends |
| I | 1.076 | 2.28 | 6165 | Mobile (stripped) wire ends |
| J | 0.995 | 2.11 | 5725 | Tapered wedge (rubber 1.25 inch) at wire ends |
| K | 1.036 | 2.20 | 5995 | Tapered wedge (metal 1.0 inch) at wire ends |
| L | 1.04 | 2.25 | 5810 | Wire ends turned up about tire bead body |
| M | 1.237 | 2.62 | 6275 | Wire ends staggered about bead internal circumference. |

In addition to the weftless beads of Table 1, several single-wire beads were modified and evaluated. In this case, four 14-inch diameter single wire beads composed of 24 wraps of 0.037-inch diameter wire coated with rubber were formed in a 4-5-6-5-4 construction, as described in FIGS. 6A and 20A. Two bead assemblies were modified, as shown in FIG. 24 with the ends 15 bent along the sidewalls 32 of the bead body 14. The two unmodified beads exhibited an average breaking load of 7035 pounds with an average elongation at break of 3.16%. The two beads with modified terminations exhibited an average breaking load of 7090 pounds with an average elongation at break of 3.89 percent.

It is believed that existing and conventional tire bead ring assemblies have the inner termination ends of the wires in the tape ribbon abruptly cut off at substantially a perpendicular angle with respect to the tire bead ring body. Accordingly, when the tire bead assemblies are broken by the expandable mandrel method, the break in the tire bead assembly is observed to occur at the point where the wire endings of the wires are in point contact with the inner peripheral surface of the tire bead assembly. Such a point contact or stress concentration provides a stress point or contact against the body of the tire bead assembly and facilitates breaking of the assembly thereby resulting in a tire bead assembly which does not possess maximum breaking load efficiency.

It has been observed also that where the outer termination ends 15 of the wires in the tape ribbon or single wire bead ring assembly are of a length such that the outer termination ends 15 and the inner termination ends 15 occur in a single plane perpendicular to the wire axis, the resultant tire bead assembly 12 does not possess maximum breaking load efficiency. Therefore, it is within the scope of the present invention that the predetermined length of tape or ribbon material or of a single wire, when wound about an axis to provide a plurality of convolutions, the outer termination ends 15 and the inner termination ends 15 do not occur in a single plane perpendicular to the wire axis, but occur at positions displaced relative to one another along the length of wire tape or single wire such that the outer and inner wire termination ends 15 are in staggered positions with respect to one another in the tire bead periphery, as depicted by the outer peripheral surface 30 and the inner peripheral surface 20, shown in FIGS. 3, 5, 17, 19, 21-22 and 24.

While the improvement in bead strength efficiency is obtained by modification of the wire terminations in the inner convolution of ribbon of the weftless tire bead assembly and the last formed inner convolution of wire of the single wire tire bead assembly, there is an advantage of the present invention in modifying the termination ends 15 of the tape or single wire which engages the outer surface 30 of the tire bead assembly. As shown in FIG. 7A, both the inner and outer termination ends 15 are tapered 22 taped to engage the inner surface 20 and outer surface 30, respectively, of the tire bead assembly 14. As shown in FIGS. 23 and 24, the termination ends 15 are bent and angled to rest along the sidewalls 32 of the tire bead assembly 14. Such modifications on both the inner and outer termination ends provide a more gradual geometrical transition between the termination ends and the body of the bead assembly which contributes to the uniformity of materials flow around the bead during the tire building process. The use of wedge means (FIG. 14 and 25-26), mechanical deformation such as rounding (FIG. 9), bending (FIGS. 15-16, 21-24 and 27) and tapering (FIG. 7A-8B) and stripping the rubber envelope 19 from the wire ends 15 (FIG. 13) are all treatments that may be applied also to the outer wire termination ends 15 where the ends 15 engage the outer peripheral surface 30 of the bead assembly 14.

Accordingly, it is within the scope of the present invention that a tire bead assembly, comprised of either a tape-type or weftless or single wire, may be continuously manufactured by reducing the cross-sectional area of the wire elements of the tape or single wire by drawing the wire elements, particularly by heat stretching in the area in which the termination ends occur. If such drawing, rolling or heat stretching treatments results in the total separation of the wire, the two ends of the separation will form respectively the ending of one bead assembly and the beginning of the next bead assembly during bnead manufacture.

In accordance with the present invention, when the wire endings 15 in the ribbon tape are mechanically treated such as by stamping, grounding or tapering the wire endings to eliminate the sharp defined stress point or contact point between the wire endings 15 and the inner peripheral surface 20 of the tire bead assembly, a improved tire bead assembly having substantially improved mechanical properties is achieved. Although the precise mechanism of how the bead assembly breaks when a breaking load is applied thereto is unknown, it is believed that the wire ends may cut into the surface of the convolutions of wire in the bead assembly or sharply bend the adjacent wires to facilitate breakage of the bead assembly at the wire ends thereof. Thus, by either lengthening the point of contact between the wire ends and the inner peripheral surface of the tire bead assembly, or reducing bending stresses results in a substantially improved tire bead assembly.

Additionally, it was observed that when the individual wires in the tape ribbon were cut at different lengths, then the wire endings 15 would engage the inner peripheral surface of the wire assembly at several points, thereby resulting in an increased strength efficient tire bead assembly when a breaking load is applied to the bead assembly by the expanding mandrel method over conventional bead assemblies.

Figure 15:
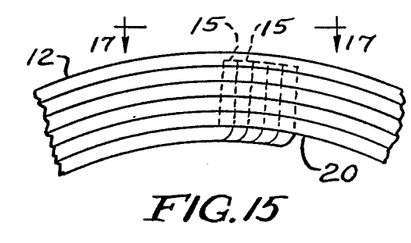
FIG. 15 is a fragmentary axial plan view of a 5×5 weftless bead assembly showing the tire bead wire ends turned upwardly through the body of the tire bead assembly in accordance with the present invention.
Figure 16:
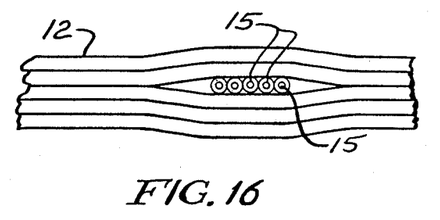
FIG. 16 is a fragmentary view looking radially inwardly through the weftless tire bead assembly taken along line 16—16 of FIG. 15.
Figure 17:
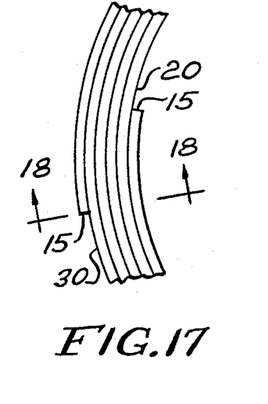
FIG. 17 is a fragmentary axial plan view of a 5×5 weftless tape tire bead assembly showing the overlapping of the tire bead ends in accordance with the present invention.
Figure 18:
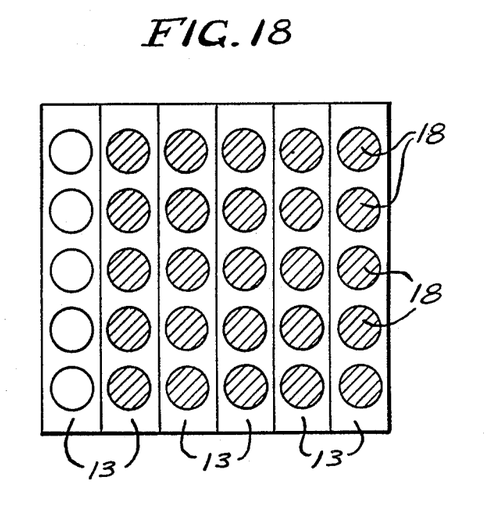
FIG. 18 is a cross-sectional view of the 5×5 weftless tape tire bead assembly taken along line 18—18 of FIG. 17.
Figure 19:
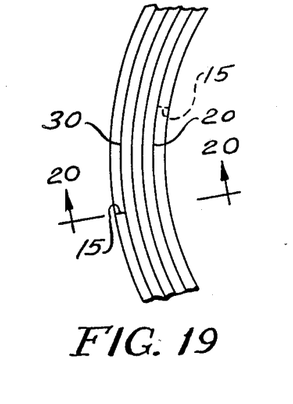
FIG. 19 is a fragmentary axial plan view of a conventional 5×5 single wire tire bead construction in accordance with the present invention.

FIGS. 15 ∝ 16, 21 and 22 are further examples of 5×5 weftless bead assemblies made in accordance with the teachings of the present invention wherein the wire endings 15 engageable with inner peripheral surface 20 of the tire bead ring body 14, are bent or turned upwardly to mesh either within the individual wires 18 of the ribbon 13 which comprise the 5×5 bead assembly (FIGS. 15 and 16) or where the endings 15 are bent and staggered to mesh within the wires 18 (FIGS. 21 and 22).

Sample L of Table I, is a weftless 5×5 tire bead assembly wherein the wire ends 15 are turned up along the sidewalls 32 of the tire bead ring body 14. The 5×5 tire bead assembly possessed a measured breaking point of 5810 pounds, an approximately 11% increase over the conventional prior art 5×5 bead assembly.

Figure 6:
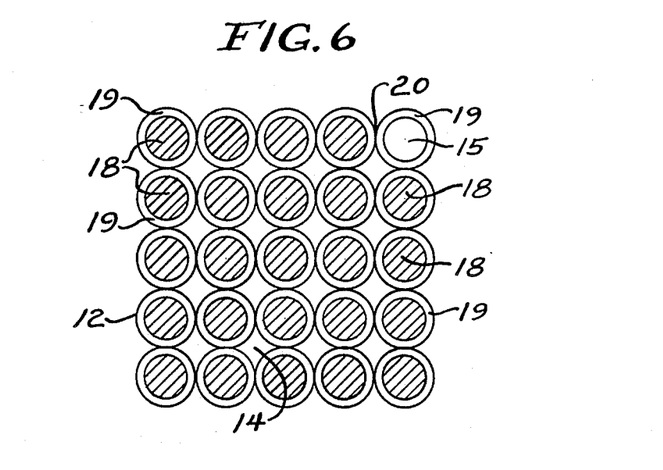
FIG. 6 is a cross-sectional view of the 5×5 conventional single wire bead taken along line 6—6 OF FIG. 5.
Figure 6A:
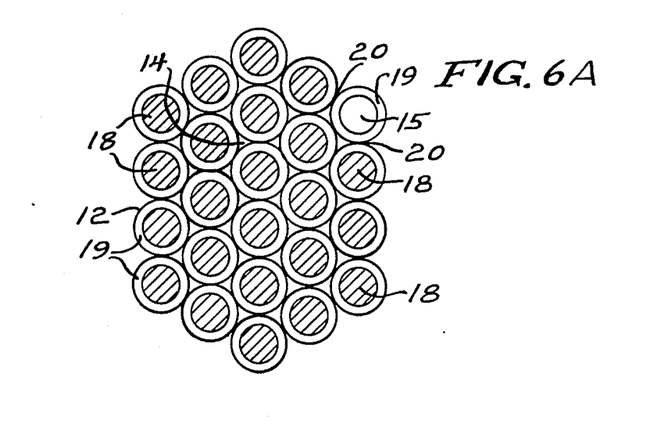
FIG. 6A is a cross-sectional view of a 4-5-6-5-4 single wire tire bead construction.

FIGS. 5-6, 19-20, 23-24 illustrate single wire 5×5 tire bead assemblies 12 and FIGS. 6A and 20A illustrate single wire 4-5-6-5-4 tire bead assemblies, to which the principles of wire end treatments in accordance with the present invention are applicable. It should be expected however that the magnitude of strength efficiency improvement will depend upon the number of wire wraps in the innermost layer. For example, in a single wire bead having few wire wraps in the interior diameter layer, such as in a 2-3-2 construction, the reduction of stress concentration around the single wire end by the above described end treatments will have a relatively larger positive effect on bead strength efficiency than in such a bead type having many wire wraps in the interior diameter layer.

The wire end treatments in accordance with the present invention are applicable to weftless beads comprised of wire elements having a plurality of wire ends and possessing non-round cross-sections, e.g. rectangular wire elements.

I claim:

1. A weftless tire bead ring assembly, comprising; a predetermined length of a wire tape material comprised of a plurality of elongated wires enveloped in polymeric material wound about an axis to provide a plurality of convolutions of the wire tape material superimposed on each other to provide a tire bead ring assembly having an inside and outside surface, with one end of said predetermined length of tape material being engageable with said inside surface of the tire bead ring assembly, and wherein said one end of said predetermined length of tape material is mechanically deformed to minimize stress concentration between said one end of the predetermined length of tape material and said inside surface of the tire bead assembly.

2. The tire bead assembly in accordance with claim 1 wherein said mechanical deformation is done by tapering said one end of said predetermined length of tape material.

3. The tire bead assembly in accordance with claim 2 wherein said tapering said one end of said predetermined length of tape material is done by grinding said ends.

4. The tire bead assembly in accordance with claim 2 wherein said mechanical deformation is done by angle cutting.

5. The tire bead assembly in accordance with claim 2 wherein said mechanical deformation is done by swagging.

6. The tire bead assembly in accordance with claim 2 wherein said mechanical deformation is done by machining.

7. The tire bead assembly in accordance with claim 1 wherein said mechanical deformation is done by rounding said one end of said predetermined length of tape material.

8. The tire bead assembly of claim 1 wherein said tire bead ring assembly is a 5×5 construction.

9. The tire bead assembly of claim 1 wherein said tire bead ring assembly is a 4×4 construction.

10. The tire bead assembly of claim 1 wherein said tire bead ring assembly is a 3×4 construction.

11. The tire bead assembly in accordance with claim 1 wherein said tire bead ring assembly further includes sidewall surfaces thereon, with said inside and outside surfaces and said sidewall surfaces defining a bead ring body protion and
wherein said mechanical deformation is done by bending said one end of said predetermined length of tape material to position the same along at least one sidewall surface of said bead ring body portion.

12. The tire bead assembly in accordance with claim 1 wherein said mechanical deformation is done by bending one end of one of the plurality of wires of said predetermined length of tape material to position the same against said inside surface of the tire bead ring assembly.

13. The tire bead assembly in accordance with claim 11 wherein said mechanical deformation is done by bending said one end of said predetermined length of tape material to position the same within said bead ring body portion.

14. A weftless tire bead ring assembly, comprising;
a predetermined length of a wire tape material comprised of a plurality of elongated wires enveloped in a polymeric material wound about an axis to provide a plurality of convolutions of the wire tape material superimposed on each other to provide a tire bead ring assembly having an inside and outside surface, with one end of said predetermined length of tape material being engageable with said inside surface of the tire bead assembly, and
wherein said one end of said predetermined length of tape material is softened by heat treatment to minimize the stress concentration between said one end of the predetermined length of tape material and said inside surface of the tire bead ring assembly.

15. The tire bead assembly in accordance with claim 14 wherein said heat treatment is done by brazing said ends to said inside surface of the bead ring assembly.

16. The tire bead assembly in accordance with claim 14 wherein said heat treatment is done by soldering said ends to said inside surface of the bead ring assembly.

17. The tire bead assembly of claim 14 wherein said tire bead ring assembly is a 5×5 construction.

18. The tire bead assembly of claim 14 wherein said tire bead ring assembly is a 4×4 construction.

19. The tire bead assembly of claim 14 wherein said tire bead ring assembly is a 3×4 construction.

20. The tire bead assembly in accordance with claim 14 wherein said heat treatment is done by wire surface welding said ends to said inside surface of the bead assembly.

21. The tire bead assembly in accordance with claim 14 wherein said heat treatment is done by heat stretching said wire tape material to sever the same to provide at least one end of said predetermined length of tape material.

22. A weftless tire bead ring assembly, comprising;
a predetermined length of a wire tape material comprised of a plurality of elongated wires enveloped in a polymeric material wound about an axis to provide a plurality of convolutions of the wire tape material superimposed on each other to provide a tire bead ring assembly having an inside and outside surface, with one end of said predetermined length of tape material being engageable with said inside surface of the tire bead ring assembly, and
wherein said one end of said predetermined length of tape material includes a cushioning means positioned between said one end of said predetermined length of tape material and said inside surface of the tire bead ring assembly to eliminate the stress concentration between said one end of the predetermined length of tape material and said inside surface of the tire bead assembly.

23. The weftless tire bead ring assembly in accordance with claim 22 wherein said cushioning means is a rubber based material.

24. The weftless tire bead ring assembly in accordance with claim 22 wherein said cushioning means is a reinforced fabric material.

25. The weftless tire bead ring assembly in accordance with claim 22 wherein said cushioning means is a metal material.

26. The weftless tire bead ring assembly in accordance with claim 25 wherein said metal material is aluminum.

27. A single wire tire bead assembly, comprising;
a predetermined length of a single wire enveloped in a polymeric material wound about an axis to provide a plurality of convolutions of the single wire superimposed on each other, to provide a tire bead assembly having an inside and outside surface, with one end of the predetermined length of a single wire being engageable with said inside surface of the tire bead assembly, and
wherein said one end of the predetermined length of a single wire is mechanically deformed to minimize the stress concentration between said one end of the predetermined length of single wire and said inside surface of the tire bead assembly.

28. The tire bead assembly in accordance with claim 27 wherein said mechanical deformation is done by tapering said one end of said predetermined length of wire.

29. The tire bead assembly in accordance with claim 28 wherein said tapering said one end of said predetermined length of wire is done by grinding said end.

30. The tire bead assembly in accordance with claim 28 wherein said mechanical deformation is done by angle cutting.

31. The tire bead assembly in accordance with claim 28 wherein said mechanical deformation is done.

32. The tire bead assembly in accordance with claim 28 wherein said mechanical deformation is done by machining.

33. the tire bead assembly in accordance with claim 27 wherein said mechanical deformation is done by rounding said one end of said predetermined length of wire.

34. The tire bead assembly of claim 27 wherein said tire bead ring assembly is a 2-3-2 construction.

35. The tire bead assembly of claim 27 wherein said tire bead ring assembly is a 3-4-3 construction.

36. The tire bead assembly of claim 27 wherein said tire bead ring assembly is a 3×4 construction.

37. The tire bead assembly in accordance with claim 27 wherein said tire bead ring assembly further includes sidewall surfaces thereon, with said inside and outside surfaces and said sidewall surfaces defining a bead ring body portion and
wherein said mechanical deformation is done by bending said one end of said predetermined length of wire to position the same along at least one sidewall surface of said bead ring body portion.

38. The tire bead assembly in accordance with claim 37 wherein said mechanical deformation is done by bending said one end of said predetermined length of wire to position the same within said bead ring body portion.

39. A single wire tire bead assembly, compirsing;
a predetermined length of a single wire enveloped in a polymeric material wound about an axis to provide a plurality of convolutions of the single wire superimposed on each other, to provide a tire bead assembly having an inside and outside surface, with one end of said predetermined length of tape material being engageable with said inside surface of the tire bead assembly, and
wherein said one end of said predetermined length of wire is softened by heat treatment to minimize the stress concentration between said one end of the predetermined length of tape material and said inside surface of the tire bed ring assembly.

40. The tire bead assembly in accordance with claim 39 wherein said heat treatment is done by brazing said ends to said inside surface of the bead ring assembly.

41. The tire bead assembly in accordance with claim 39 wherein said heat treatment is done by soldering said end to said inside surface of the bead ring assembly.

42. The tire bead assembly of claim 39 wherein said tire bead ring assembly is a 2-3-2 construction.

43. The tire bead assembly of claim 39 wherein said tire bead ring assembly is 3-4-3 construction.

44. The tire bead assembly of claim 39 wherein said tire bead ring assembly is a 3-4-5-4-3 construction.

45. The tire bead assembly in accordance with claim 39 wherein said heat treatment is done by wire surface welding said end to said inside surface of the bead ring assembly.

46. The tire bead assembly in accordance with claim 39 wherein said heat treatment is done by heat stretching said length of wire to sever the same to provide at least one end of said predetermined length of wire.

47. A single wire tire bead assembly, comprising;
a predetermined length of a single wire enveloped in a polymeric material wound about an axis to provide a plurality of convolutions of the single wire superimposed on each other, to provide a tire bead assembly having an inside and outside surface, with one end of the predetermined length of a single wire being engageable with said inside surface of the tire bead assembly, and
wherein said one end of said predetermined length of wire material includes a cushioning means positioned between said one end of said predetermined length of tape material and said inside surface of the fire bead ring assembly to eliminate the stress conentration between said one end of the predetermined length of wire and said inside surface of the tire bead assembly.

48. The single-wire bead ring assembly in accordance with claim 47 wherein said cushioning means is a rubber based material.

49. The single-wire bead ring assembly in accordance with claim 47 wherein said cushioning means is a reinforced fabric material.

50. The single wire bead ring assembly in accordance with claim 47 wherein said cushioning means is a metal material.

51. A weftless tire bead ring assembly, comprising;
a predetermined length of a an array of elongate material comprised of a plurality of elongated non round wires wound about an axis to provide a plurality of convolutions of the non round wire array superimposed on each other to provide a tire bead ring assembly having an inside and outside surface, with one end of said predetermined length of elongate material being engageable with said inside surface of the tire bead ring assembly, and
wherein said one end of said predetermined length of elongate material is mechanically deformed to minimize the stress concentration between said one end of the predetermined length of elongate material and said inside surface of the tire bead assembly.

52. The tire bed assembly in accordance with claim 51 wherein said mechanical deformation is done by tapering said one end of said predetermined length of elongate material array.

53. The tire bead assembly in accordance with claim 52 wherein said tapering said one end of said predetermined length of elongate material is done by grinding said ends.

54. The tire bead assembly in accordance with claim 52 wherein said mechanical deformation is done by angle cutting.

55. the tire bead assembly in accordance with claim 52 wherein said mechanical deformation is done by swagging.

56. The tire bead assembly in accordance with claim 52 wherein said mechanical deformation is done by machining.

57. The tire bead assembly in accordance with claim 51 wherein said mechanical deformation is done by rounding said one end of said predetermined length of elongate material.

58. The tire bead assembly of claim 51 wherein said tire bead ring assembly is a 5×6 construction.

59. The tire bead assembly of claim 51 wherein said tire bead ring assembly is a 4×4 construction.

60. The tire bead assembly of claim 51 wherein said tire bead ring assembly is a 3×4 construction.

61. The tire bead assembly in accordance with claim 51 wherein said tire bead ring assembly further includes sidewall surfaces thereon, with said inside and outside surfaces and said sidewall surfaces defining a bead ring body portion and
wherein said mechanical deformation is done by bending said one end of said predetermined length of elongate material to position the same along the least one sidewall surface of said bead ring body portion.

62. The tire bead assembly in accordance with claim 61 wherein said mechanical deformation is done by bending said one end of said predetermined length of elongate material to position the same within said bead ring body portion.

63. A weftless tire bead ring assembly, comprising;
a predetermined length of an array of elongate material comprised of a plurality of elongated non round wires wound about an axis to provide a plurality of convolutions of the non round wire array superimposed on each other to provide a tire bead ring assembly having an inside and outside surface, with one end of said predetermined length of elongate material being engageable with said inside surface of the tire bead assembly, and
wherein said one end of said predetermined length of elongate material is softened by heat treatment to minimize the stress concentration between said one end of the predetermined length of elongate material and said inside surface of the tire bead ring assembly.

64. The tire bead assembly in accordance with claim 63 wherein said heat treatment is done by brazing said ends to said inside surface of the bead ring assembly.

65. The tire bead assembly in accordance with claim 63 wherein said heat treatment is done by soldering said ends to said inside surface of the bead ring assembly.

66. The tire bead assembly of claim 63 wherein said tire bead ring assembly is a 5×5 construction.

67. The tire bead assembly of claim 63 wherein said tire bead ring assembly is a 4×4 construction.

68. The tire bead assembly of claim 63 wherein said tire bead ring assembly is a 3×4 construction.

69. The tire bead assembly in accordance with claim 63 wherein said heat treatment is done by wire surface welding said ends to said inside surface of the bead assembly.

70. The tire bead assembly in accordance with claim 63 wherein said heat treatment is done by heat stretching said elongated non-round wires to sever the same to provide at least one end of said predetermined length of elongate material.

71. A weftless tire bead ring assembly, comprising;
a predetermined length of an array of elongate material comprised of a plurality of elongated non round wires wound about an axis to provide a plurality of convolutions of the wire tape material superimposed on each other to provide a tire bead ring assembly having an inside and outside surface, with one end of said predetermined length of elongate material being engageable with said inside surface of the tire bead ring assembly, and
wherein said one end of said predetermined length of elongate material includes a cushioning means positioned between said one end of said predetermined length of tape material and said inside surface of the tire bead ring assembly to eliminate the stress concentration between said one end of the predetermined length of elongate material and said inside surface of the tire bead assembly.

72. The weftless tire bead ring assembly in accordance with claim 71 wherein said cushioning means is a rubber based material.

73. The weftless tire bead ring assembly in accordance with claim 71 wherein said cushioning means is a reinforced fabric material.

74. The weftless tire bead ring assembly in accordance with claim 71 wherein said cushioning means is a metal material.

75. A weftless tire bead ring assembly, comprising;
a predetermined length of a wire tape material comprised of a plurality of elongated wires enveloped in polymeric material wound about an axis to provide a plurality of convolutions of the wire tape material superimposed on each other to provide a tire bead ring assembly having an inside and outside surface, with one end of said predetermined length of tape material being engageable with said inside surface of the tire bead ring assembly, and one end said predetermined length of tape material being engageable with said outside surface of the tire bead assembly,
wherein the wire ends of said predetermined length of tape material do not occur in a single plane perpendicular to the wire axes but rather occur at positions displaced relative to one another along the length of wire tape such that the wire termination ends are in staggered positions with respect to the inner and outer surfaces of the tire bead ring assembly; and
wherein at least one end of said predetermined length of tape material possesses a reduced wire cross-section to provide a reduced stress concentration when said at least one end is engaged against the inner or outer surface of the tire bead ring assembly.

76. The weftless tire bead assembly in accordance with claim 75 wherein said reduced wire cross-section is provided by mechanical deformation of said at least one end of said predetermined length of tape material.

77. The weftless tire bead assembly in accordance with claim 76 wherein said mechanical deformation is done by tapering said one end of said predetermined length of tape material.

78. The weftless tire bead assembly in accordance with claim 77 wherein said tapering is done by grinding.

79. The weftless tire bead assembly in accordance with claim 76 wherein said mechanical deformation is done by angle cutting.

80. The weftless tire bead assembly in accordance with claim 76 wherein said mechanical deformation is done by swagging.

81. The weftless tire bead assembly in accordance with claim 76 wherein said mechanical deformation is done by machining.

82. The weftless tire bead assembly in accordance with claim 75 wherein said reduced wire cross-section is provided by heat stretching said tape material to sever the same to provide at least one end of said predetermined length of tape material.

83. A single wire bead ring assembly, comprising;
a predetermined length of a single wire enveloped in polymeric material wound about an axis to provide a plurality of convolutions of the single wire superimposed on each other to provide a tire bead ring assembly having an inside and outside surface, with one end of said predetermined length of a single wire being engageable with said inside surface of the tire bead ring assembly, and one end said predetermined length of a single wire being engageable with said outside surface of the tire bead assembly,
wherein the wire ends of said predetermined length of a single wire do not occur in a single plane perpendicular to the wire axes but rather occur at positions displaced relative to one another along the length of wire tape such that the wire termination ends are in staggered positions with respect to the inner and outer surfaces of the tire bead ring assembly; and
wherein at least one end of said predetermined length of a single wire possesses a reduced wire cross-section to provide a reduced stress concentration when said at least one end is engaged against the inner or outer surface of the tire bead ring assembly.

84. The weftless tire bead assembly in accordance with claim 83 wherein said reduced wire cross-section is provided by mechanical deformation of said at least one end of said predetermined length of a single wire.

85. The weftless tire bead assembly in accordance with claim 84 wherein said mechanical deformation is done by tapering said one end of said predetermined length of a single wire.

86. The weftless tire bead assembly in accordance with claim 85 wherein said tapering is done by grinding.

87. The weftless tire bead assembly in accordance with claim 85 wherein said tapering is done by angle cutting.

88. The weftless tire bead assembly in accordance with claim 85 wherein said tapering is done by swagging.

89. The weftless tire bead assembly in accordance with claim 85 wherein said tapering is done by machining.

90. The weftless tire bead assembly in accordance with claim 83 wherein said reduced wire cross-section is provided by rounding said at least one end of said predetermined length of a single wire.

91. The weftless tire bead assembly in accordance with claim 83 wherein said reduced wire cross-section is provided by heat stretching said single wire to sever the same to provide at least one end of said predetermined length of a single wire.

92. A weftless tire bead ring assembly, comprising:
a predetermined length of a wire tape material comprised of a plurality of elongated wires enveloped in polymeric material wound about an axis to provide a plurality of convolutions of the wire tape material superimposed on each other to provide a tire bead ring assembly having an inside and outside surface, with one end of said predetermined length of tape material being engageable with said inside surface of the tire bead ring assembly, and
wherein said one end of said predetermined length of tape material includes a wedge means positioned adjacent to said one end of said predetermined length of tape material and engagine said inside surface of the tire bead ring assembly to minimize the stress concentration between said one end of the predetermined length of tape material and said inside surface of the tire bead assembly.

93. The weftless tire bead ring assembly in accordance with claim 92 wherein said wedge means is a rubber based material.

94. The weftless tire bead ring assembly in accordance with claim 92 wherein said wedge means is a reinforced fabric material.

95. The weftless tire bead ring assembly in accordance with claim 92 wherein said wedge means is a metal material.

96. The weftless tire bead ring assembly in accordance with claim 95 wherein said metal material is aluminum.

97. A weftless tire bead ring assembly, comprising;
a predetermined length of a wire tape material comprised of a plurality of elongated wires enveloped in polymeric material wound abut an axis to provide a plurality of convolutions of the wire tape material superimposed on each other to provide a tire bead ring assembly having an inside and outside surface, with one end of said predetermined length of tape material being engageable with said inside surface of the tire bead ring assembly, and
wherein said one end of said predetermined length of tape material has the envelope of polymeric material adjacent to said predetermined length of tape material removed between said one end of the predetermined length of tape material and said inside surface of the tire bead assembly.

98. A single wire tire bead assembly, comprising:
a predetermined length of a single wire enveloped in a polymeric material wound about an axis to provide a plurality of convolutions of the single wire superimposed on each other, to provide a tire bead assembly having an inside and outside surface, with one end of the predetermined length of a single wire being engageable with said inside surface of the tire bead assembly, and
wherein said one end of the predetermined length of a single wire has the envelope of polymeric material adjacent to said end of said predetermined length of single wire removed to minimize the stress concentration between said one end of the predetermined length of single wire and said inside surface of the tire bead assembly.

99. A weftless tire bead ring assembly, comprising;
a predetermined length of an array of elongate material comprised of a plurality of elongated non round wires wound about an axis to provide a plurality of convolutions of the non round wire array superimposed on each other to provide a tire bead ring assembly having an inside and outside surface, with one end of said predetermined length of elongate material being engageable with said inside surface of the tire bead ring assembly, and one end said predetermined length of elongate material being engageable with said outside surface of the tire bead assembly,
wherein said one end of said predetermined length of elongate material do not occur in a single plane perpendicular to the wire axes but rather occur at positions displaced relative to one another along the length of wire tape such that the wire termination ends are in staggered positions with respect to the inner and outer surfaces of the tire bead ring assembly; and tire bead assembly, and
wherein at least one end of said predetermined length of elongate material possesses a reduced wire cross-section to provide a reduced stress concentration when said at least one end is engaged against the inner or outer surface of the tire bead ring assembly.

100. The weftless tire bead assembly in accordance with claim 99 wherein said reduced wire cross-section is provided by mechanical deformation of said at least one end of said predetermined length of elongate material.

101. The weftless tire bead assembly in accordance with claim 100 wherein said mechanical deformation is done by tapering said one end of said predetermined length of elongate material.

102. The weftless tire bead assembly in accordance with claim 101 wherein said tapering is done by grinding.

103. The weftless tire bead assembly in accordance with claim 101 wherein said mechanical deformation is done by angle cutting.

104. The weftless tire bead assembly in accordance with claim 101 wherein said mechanical deformation is done by swagging.

105. The weftless tire bead assembly in accordance with claim 101 wherein said mechanical deformation is done by machining.

106. The weftless tire bead assembly in accordance with claim 99 wherein said reduced wire cross-section is provided by rounding said at least one end of said predetermined length of elongate material.

* * * * *

UNITED STATES PATENT AND TRADEMARK OFFICE
CERTIFICATE OF CORRECTION

PATENT NO. : 4,820,563

DATED : April 11, 1989

INVENTOR(S) : Doyle W. Rausch

It is certified that error appears in the above—identified patent and that said Letters Patent is hereby corrected as shown below:

Column 5, line 48, "pf" should be -- of --;
    line 50, "FIG." should be -- FIGS. --;
    line 50, "7A-8A" should be -- 7A-8B --;

Column 6, line 45 "tie" should be -- tire --;
    line 55, delete the second occurrence of "over";

Column 9, line 32 "bnead" should be -- bead --;
    line 59, after 15, delete the marking thereon and insert "-";

Column 11, line 7, "protion" should be -- portion --;

Column 12, line 50, "the" should be -- The --;

Column 13, line 19, "bed" should be -- bead --;
    line 53, "fire" should be -- tire --;
    line 54, "conentration" should be -- concentration --;

Column 14, line 13, "bed" should be --bead --;

UNITED STATES PATENT AND TRADEMARK OFFICE
CERTIFICATE OF CORRECTION

PATENT NO. : 4,820,563

DATED : April 11, 1989

INVENTOR(S) : Doyle W. Rausch

It is certified that error appears in the above-identified patent and that said Letters Patent is hereby corrected as shown below:

Column 17, line 33, delete "engagine" and insert -- engaging --;
    line 54, "abut" should be -- about --;

Signed and Sealed this

Fourteenth Day of November, 1989

*Attest:*

JEFFREY M. SAMUELS

*Attesting Officer*    *Acting Commissioner of Patents and Trademarks*